United States Patent

Katz et al.

[11] Patent Number: 6,110,555
[45] Date of Patent: Aug. 29, 2000

[54] METAL-CERAMIC LAMINAR-BAND COMPOSITE

[75] Inventors: Samuel Katz, Beer-Sheba; Michael Katz, Yavne, both of Israel

[73] Assignee: Ceramight Composites Ltd., Yavneh, Israel

[21] Appl. No.: 09/185,753

[22] Filed: Nov. 4, 1998

[30] Foreign Application Priority Data

Jan. 2, 1998 [IL] Israel .......................................... 122843

[51] Int. Cl.⁷ .............................. B32B 3/14; B32B 31/20; B32B 31/26
[52] U.S. Cl. ........................ 428/44; 428/105; 156/89.11; 156/89.27; 156/89.28
[58] Field of Search ................... 428/105, 44; 156/89.21, 156/89.19, 89.16, 89.25, 89.28, 89.11, 89.27

[56] References Cited

U.S. PATENT DOCUMENTS 3,469,297   9/1969   Webber ..................................... 29/180

FOREIGN PATENT DOCUMENTS 0228839   7/1987   European Pat. Off. .
5028858   2/1993   Japan .
464727   4/1937   United Kingdom .

*Primary Examiner*—Alexander S. Thomas
*Attorney, Agent, or Firm*—Ladas & Parry

[57] ABSTRACT

A metal-ceramic laminar-band multi matrix composite, intended for use in oxidizing, reductive or inert media at temperatures up to 1500÷2800° C. and a method of the manufacture is provided. The composite material contains up to 85 vol. % of an oxide component, for example, yttria, zirconia, hafnia, up to 85 vol. % of a compound devoid of oxygen, such as zirconium carbide, and 15÷75 vol. % of a refractor metal, such as tungsten, molybdenum or chromium. Each of the above mentioned components of the composite exists in the form of a plurality of curved tapes. The tapes of every component are joined with the tapes of other components forming multilayer curved band-like chips, which are randomly interlaced in a compact 3-dimensioned pattern of the chips. The novel composites have high mechanical properties, are thermal- and crack resistant, and have a good thermal-shock and oxidation-erosion resistance at temperatures of 1200° C. to 2800° C.

35 Claims, 9 Drawing Sheets

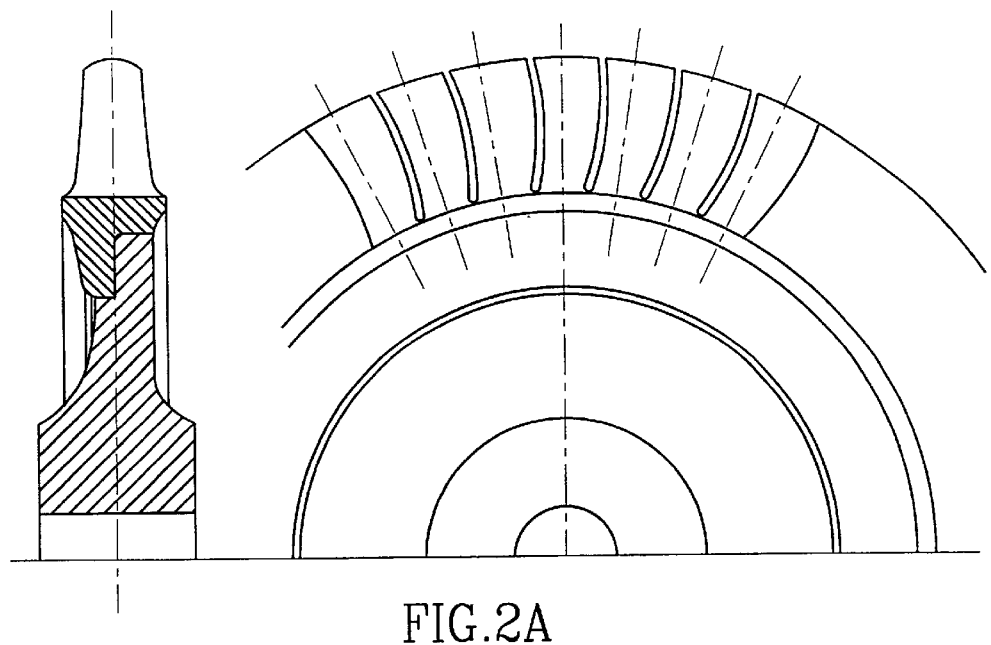
FIG.2A
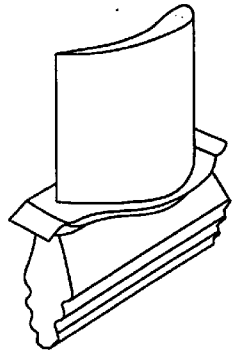
FIG.2B
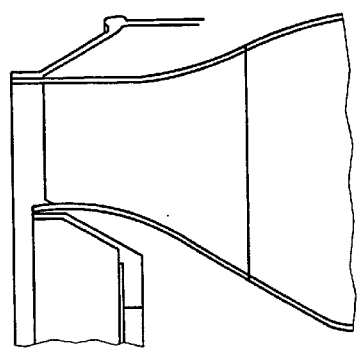
FIG.2C
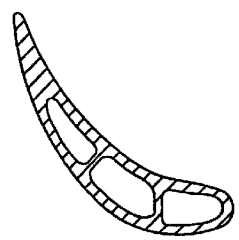

METAL-CERAMIC LAMINAR-BAND COMPOSITE

BACKGROUND OF THE INVENTION

The present invention relates to powder metallurgy and, in particular, to laminated metal-ceramic composite materials, which can be used for manufacture of some engineering parts of a high-temperature apparatus, specifically for thermal-protection linings, nozzles, combustion chambers, turbine blades and guide vanes of jet engines, crucibles, protection tubes of immersion thermometers for molten metals.

As it is well known, in different branches of industry there is a need for in principle new high-temperature (1500÷2800° C.) composites, which should be able to withstand extreme conditions of large mechanical loads, abrasive and oxidative influences, thermal shocks, etc.

In accordance with thermal and mechanical requirements the composites can be subdivided into the following groups:

Group 1: Composites, keeping for a long time in oxidizing media at a temperature up to 1500÷1800° C. an enough strength, impact resistance, hardness. The most important applications of the composites include turbine blades, guide vanes and combustion chamber lining of jet engines;

Group 2: Composites, working at temperatures up to 2000° C. and in a conditions of large thermal shocks, but are not exposed to serious mechanical loads. The most important applications of the composites include crucibles for high-temperature metals casting, protection tubes of immersion thermometers for molten metals;

Group 3: Composites, working at a temperature up to 2500÷2800° C. in abrasive and oxidative high-speed gas fluxes, at moderate mechanical loads, but in conditions of large heat flows and thermal shocks. The most important applications of the composites include nozzles, combustion chambers, turbopump parts, thermal protection plates.

A number of composite material classes have been considered as potential candidates for these applications.

There are known metal-ceramic composites, which comprise a ceramic matrix and a powder or fibrous metallic inclusions. Thermal and crack endurance, fracture toughness of a such dispersion- or fibrous reinforced composites are insufficient for a majority of the above mentioned applications. With considerable advantages posses a metal-ceramic composites with a laminated structure which provides an increase of the above mentioned properties as a result of metallic component addition in the form of thin layers.

The characteristic feature of the laminated composites is the braking of cracks on ceramic-metal interfaces: a crack, arising in ceramic layer, canceling at approach to metallic layer mainly because of the layer larger ductility.

In this subgroup of composites are the best known a multilayer composites (FIG. 1A), which consist, in particular, of alternating metallic and oxide layers.

The manufacture methods of such composites are based on use of organo-ceramic and organo-metallic films, making from a pastes, suspensions, slurries, cements, mastics, containing metallic and oxide powders with different organic binders (U.S. Pat. No. 3,556,837, U.S. Pat. No. 4,929,295, U.S. Pat. No. 5,223,064, JP 4114981, SU 1089077).

Composites of the subgroup have usually a good thermal shock resistance, high heat-insulating properties, but at the same time they have a number of typical drawbacks: limited interlayer adhesion and, as a consequence, lower mechanical properties, poor abrasion and wear resistance, and, as it must be especially noted, with such composites there is a problem of complex shape forming.

In this subgroup of metal-ceramic composites with a laminated structure are known also composites with so called laminar-granular structure, comprising randomly arranged cube-like multilayer granules (FIG. 1B) (for example: The composite $HfO_2$/Mo, J. Space/Aeron., 1965, v.43, No. 4, p.54). Substantially more complex parts can be manufactured from such composites, than from above mentioned multilayer composites, but there are a lot of different imperfections at interfaces of the multilayer granules, that results in reduction of strength, abrasion resistance and other mechanical properties.

SUMMARY OF THE INVENTION

The object of the present invention is to provide an isotropic metal-ceramic multi matrix composite, built from randomly interlaced multilayer curved band-like chips (FIG. 1C), with a high strength, thermal-shock and abrasion resistance and with other high physico-mechanical properties, which can be used at a temperature of 1500–2800° C., and the simple and available method of its manufacture, which allows the production of complicated shape articles.

The aim is achieving by those way, that the composite consists of the following components:

refractory oxide, for example, such as alumina, yttia, zirconia or hafnia.

This component is not obligatory for all versions of the composite;

an oxygen devoid compound, possessing increased high-temperature creep resistance, for example, zirconium carbide or hafnium carbide.

This component is not obligatory for all versions of the composite;

a ductile component of refractory metal, for example, molybdenum or tungsten metal.

Every component of the novel composite is in the form of curved tapes with a thickness in the range of 5÷200 microns, with a length in the range 25–150 thickness of the tape and with a width that is in the range of 5–50 thickness of the tape. The tapes form multilayer curved band-shaped chips, which are randomly interlaced, that provide the isotropic properties of the composite.

The laminar-band structure has amongst others advantages, such as:

The metallic tapes create, because of their plasticity, like in other multilayer structures with a metallic component, numerous barriers against cracks spreading and development, that provides a dramatic increase of a thermo- and crack-endurance;

Because in the novel composite at least one component forms a continuum, it has increased, as compared with other laminated composites of equal chemical composition, strength, fracture toughness, wear resistance, erosion resistance and oxidation resistance;

As a result of random arrangement of the multilayer band-shaped curved chips the novel composite structure is isotropic.

BRIEF DESCRIPTION OF DRAWINGS

FIG. 1A is a multilayer composite;

FIG. 1B is a laminar-granular composite; and

FIG. 1C is a laminar-band composite;

FIG. 2A: shows a turbine wheel, turbine blade and guide vane made of novel composite;

FIG. 2B: is an isometric view of a turbo-pump blade;

FIG. 2C: shows a nozzle-guide vane;

DETAILED DESCRIPTION

Figure 1A:
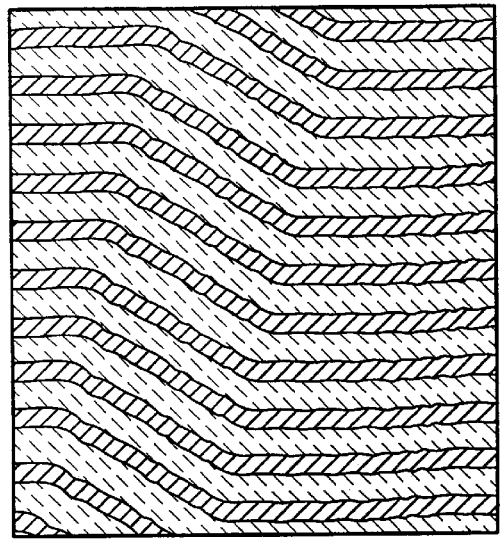
FIGS. 1A–C: show metal-ceramic laminated composites with different structure as follows.
Figure 1B:
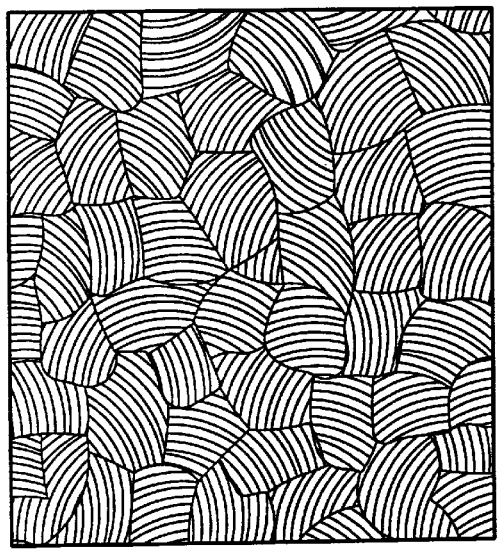
Figure 1C:
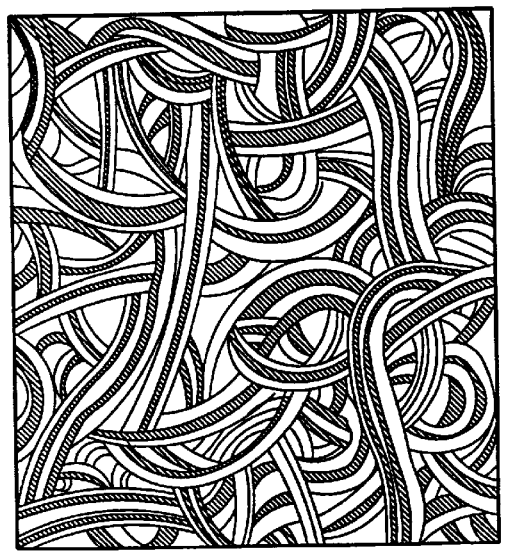

The experimental research results (see the discussion of Tables 2–5), have shown that in the novel composites the volume fraction of metallic component, parameter "m", can be from 0.15 up to 0.7, preferably from 0.2 up to 0.5. With an increase of "m" takes place an increase of crack resistance and thermal endurance of the novel composites, and also an increase of strength, but at the same time takes place an increase of specific gravity, decrease of hardness, decrease of erosion-corrosion resistance and of wear resistance.

TABLE 1

The ranges of volume fractions of components in the three different groups of the novel composites:

| Group of the novel composites | Maximum work temperature, °C. | Components: | | |
|---|---|---|---|---|
| | | Oxide | Carbide | Metal |
| 1 | 1500 | 0.3 ÷ 0.8 | — | 0.2 ÷ 0.7 |
| 2 | 2000 | 0.5 ÷ 0.85 | — | 0.15 ÷ 0.5 |
| 3 | 2800 | 0.3 ÷ 0.85 | 0 ÷ 0.3 | 0.2 ÷ 0.7 |

The above three groups of high-temperature (1500–2800° C.) composites are needed in different branches of industry.

The novel composites are applicable in the three groups. In many situations the novel composites are probably the only solution of the problem of new high-temperature composites.

The articles of Group 1 (see classification in the "Background of the Invention" section), such as nozzle guide vanes and turbine blades of gas turbine engines (FIGS. 2B–2C), must keep for a long time a high strength, fracture toughness, chemical erosion resistance, thermal shock and oxidizing resistance, fatigue and creep resistance at a temperature up to 1300÷1500° C.

As a Group 1 composites can serve the novel composites, in which as an oxide component are used, for example, some compounds in the systems on the basis of $Al_2O_3$, $SiO_2$, $Y_2O_3$, fully stabilized $ZrO_2$, which sintering temperature do not exceed 1400÷1600° C., for example, it can be such a compound as $3Al_2O_3 \cdot 2SiO_2$ (mullite), or a different compounds in such systems as $Al_2O_3$—$TiO_2$, or $ZrO_2$—$Y_2O_3$—$Al_2O_3$.

As a ductile component of the Group 1 composites are used alloys, possessing a prolonged oxidizing resistance at a temperature of 1300÷1500° C. and compatibility with the oxide component as concern the sintering temperature.

For example, there can be used Cr metal and its alloys, and also such alloy as NiAl—Cr and some other alloys on their basis.

A very good example of the Group 1 composite is a Mullite/Chromium composite. The specimens of this composite have very good properties just after pressureless sintering: bending strength $_{bend}$=300±20 MPa, the strength o is steady practically in the temperature range up to 1200° C.; fracture toughness $K_{1c}$=10–14 MPa·m$^{1/2}$; the maximum deformation is reaching 0.17% at room temperature; specimens mass changes are absent at a heating in air up to 1200° C. during a period of 200 hours; the specimens possess with very high resistance to multiple quenches in water; for instance, the specimens withstood no less than 80 to 100 quenches 1200° C.→20° C. (water).

Figure 3A:
FIGS. 3A–3C: show immersion thermometers for molten metals made of the novel composite of the invention, having a protection tube made of the novel composite (1), a two round hole insulator (2), thermo-wires (3), thermo-couple hot spot (4) and stainless steel chuck (5)
Figure 3B:
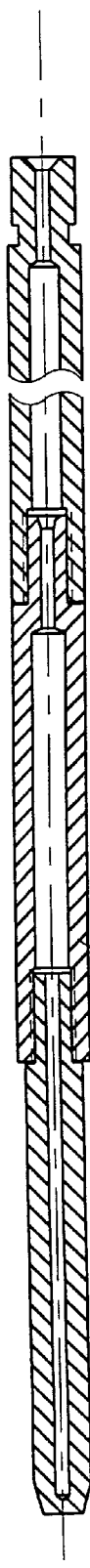
Figure 3C:
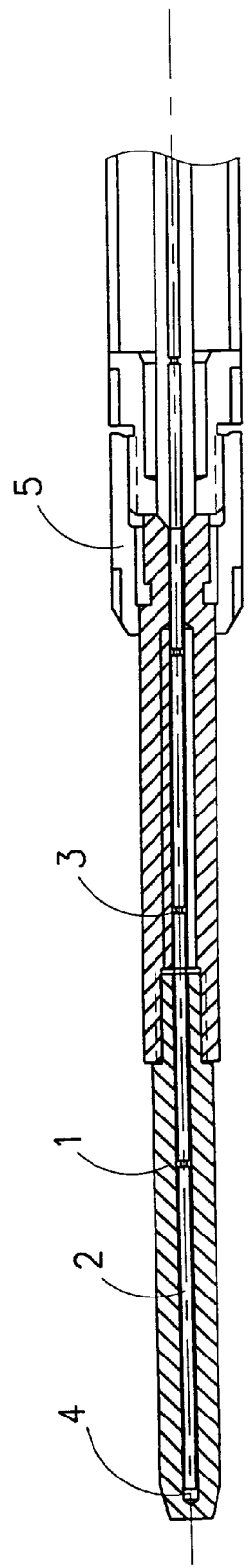
Figure 4A:
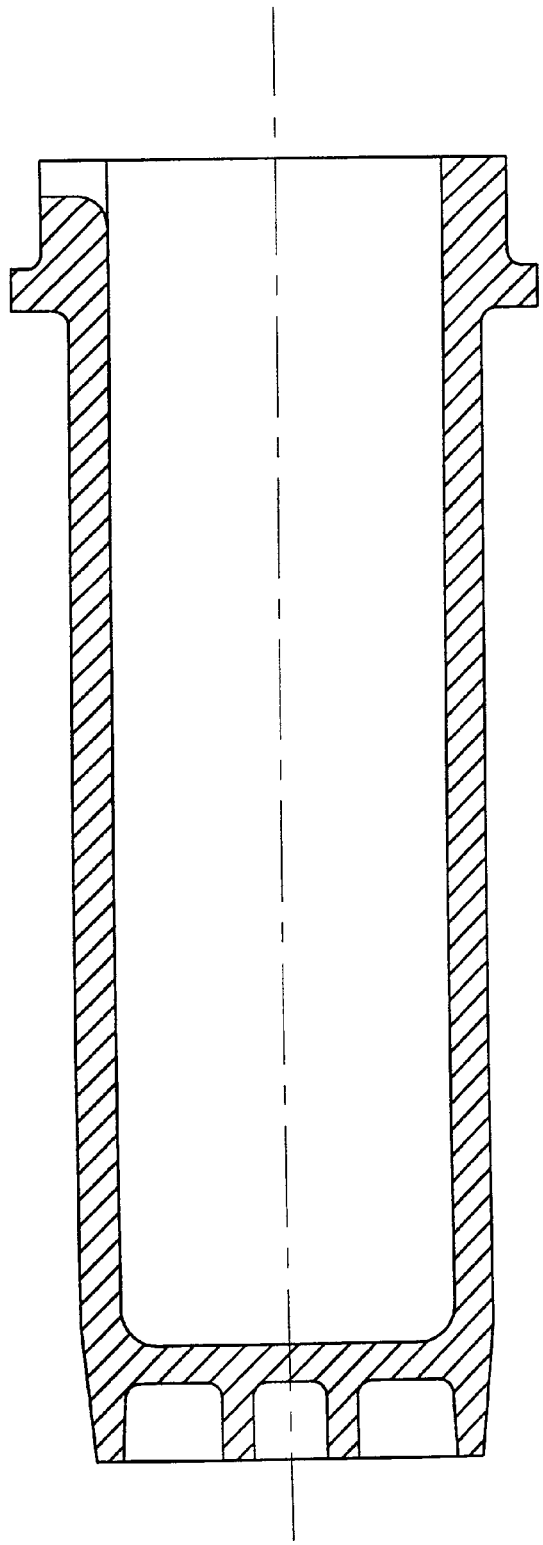
FIGS. 4A and 4B: show crucibles made of the novel composites for molten metals and salts.
Figure 4B:
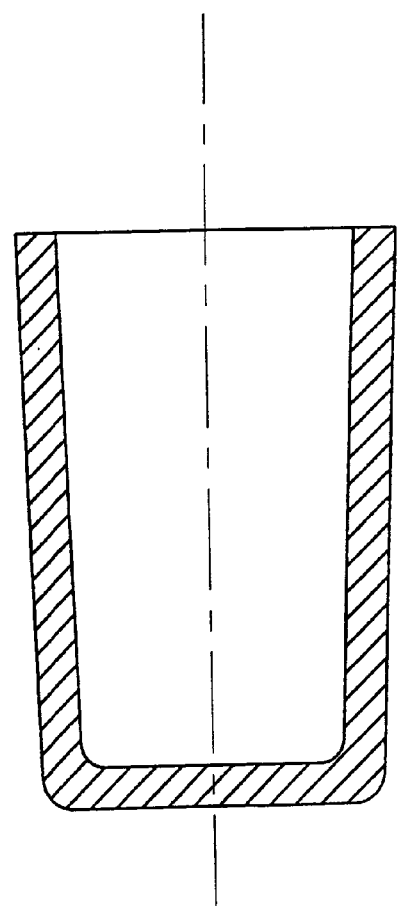

The articles of Group 2, intended for work at temperatures up to 2000° C. and at severe thermal shocks, but not at too large tensions (for example, such parts, as crucibles (FIGS. 4A and 4B), protection tubes of immersion thermometers (FIG. 3), heat resistant linings), can be manufactured from the novel composites, which contain as a metal component the refractory metals Nb, Mo, W and others, and as oxide component they contain the following refractory oxides:

$Al_2O_3$, $Y_2O_3$, fully stabilized $ZrO_2$ or $HfO_2$ and others. Some important properties of Group 2 the novel composites are shown in Table 3 and Table 4. As an example of a very effective application of the Group 2 composites can serve protection tubes of immersion thermometers for liquid steel and its alloys, liquid copper and brass, and many other metals and their alloys, made from $n(Al_2O_3+TiO_2)/Mo$ the novel composites (FIGS. 3A–3C). The protection tubes possess a very high resistance against erosion in slag, thermal shock resistance, small inertness, life time in liquid steel more than 3÷5 hours, and provide continuous and precise temperature measurement. Such protection tube wall thickness can be, for example, from 2 to 5 mm.

Figure 5A:
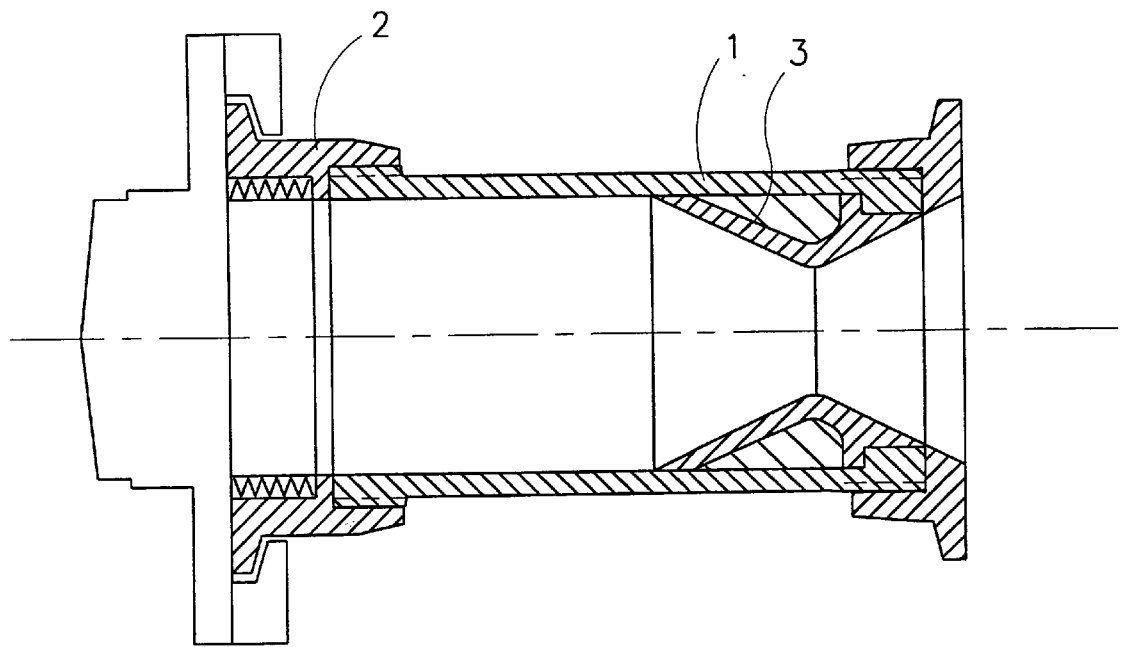
FIG. 5A: shows a liquid propelled combustion chamber made of the novel composites of the Group 3, as defined herein, having a combustion chamber made of high strength and low permeability composite (1), heat insulator made of low thermal conductivity composite (2) and a nozzle insert made of ultra erosion resistant composite (3)
Figure 5B:
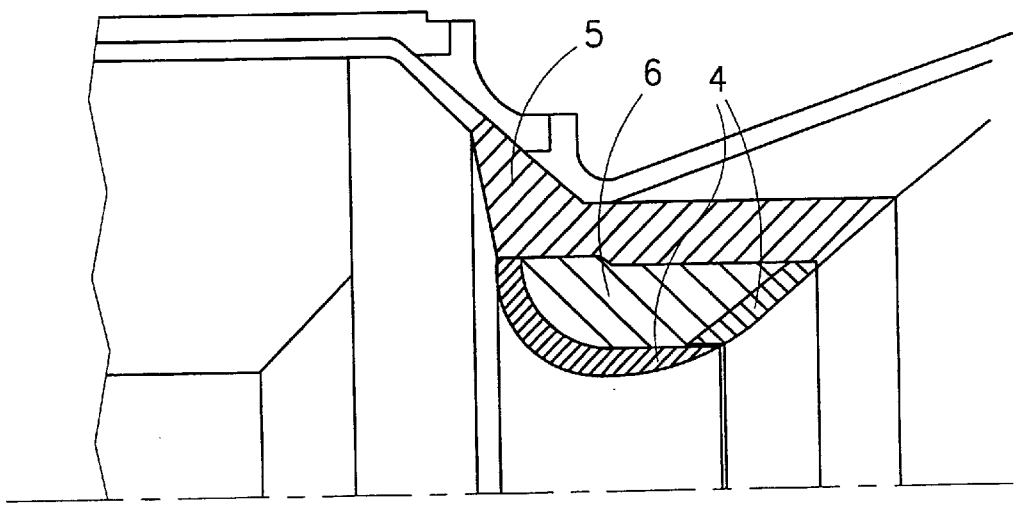
FIG. 5B: shows a nozzle of solid propelled motor made of the novel composites of the Group 3 in accordance with the invention, having a thin wall nozzle throat insert made of the ultra erosion resistant composite (4), cartridge made of carbon phenolic (5) and a graphite cartridge (6)

The articles of Group 3, must work at a temperatures up to 2500–2800° C. in aggressive gas jets at large heat fluxes and thermal shocks (nozzles, combustion chambers (FIGS. 5A–5B), etc.), must keep at the ultra high temperatures an enough strength, hardness and other mechanical properties, and simultaneously they must possess a high oxidizing and abrasion resistance.

The thermochemical influence of such aggressive gas jets must not cause appreciable mass loss, erosion, within a work time of 10 to 5000 seconds. These articles must withstand a large number of thermal shocks and be light weight because of their most frequent applications in a sufficiently light weight apparatus.

As Group 3 composites can serve the novel composites where as metallic component use refractory metals, for example, W, Mo, Ta and their alloys, melting temperatures of which are over 2500–3000° C., and as an oxide component are used the oxides with the highest refractoriness, in the first place fully stabilized $ZrO_2$, $HfO_2$, $ThO_2$.

The most important properties of some two-component the novel composites of the Group 3 are shown in Table 4.

In the novel three-component composites of Group 3 are used as an oxygen devoid component some carbides of transition metals, such as ZrC, NbC, HfC, TaC. These carbides and some compounds on their basis (see Table 5) are the only substances which keep strength and creep-resistance up to about 2500–3000° C. But since the carbides don't possess any plasticity and oxidizing resistance, their volume contents in the novel composites must be no more than 20 to 30%.

From Group 3 the novel composites can be made jet engine nozzles, mainly non cooled, with a throat diameter of 1 to 200 mm which are of the most practical importance.

Nozzles with a bigger throat diameter, for instance, up to 500 to 800 mm, can be manufactured with use of a multi-part design approach only. It must be specially noted that such a multi-part design provides a substantial increase of a nozzle thermal endurance.

For the same purpose of an enlarged thermal endurance providing the wall thickness of the nozzle throat inserts must not exceed 3–6 mm.

Three major characteristics that the rocket motor nozzle material must possesses and which are dictated by the above mentioned functional conditions, are a very high erosion resistance, thermal shock resistance and adjustable thermal conductivity according to the application. The novel composites of the Group 3 are probably the only materials which possess simultaneously all of the characteristics.

The Group 3 novel composites have an adjustable in a very wide range thermal conductivity, which is chosen according to permitted temperature on the internal (hot) and external surfaces of nozzle, and also depends on the needed local heat flux through the nozzle wall.

The maximum work temperature on the internal (hot) surface of rocket nozzle can be reached by use of the novel composites, which comprise as a compound devoid of oxygen component post eutectic carbide-graphites in the systems ZrC—C, TaC—C, NbC—C or HfC—C and as metallic component the W with addition of up to 2 wt. % of $ThO_2$; for instance, the novel composites n(HfC—C)/W can be used. Beside of a very high work temperature and erosion resistance such composite possesses a high thermal endurance, that is typical for the post eutectic carbide-graphites.

METHOD OF MANUFACTURE

The invention can't be realized by using known methods of laminar and multilayer composite manufacture.

The essence of the novel method consists in operations sequence, which insure production of composite with above-described laminar-band structure.

In accordance with the present invention, the method of the novel composite article forming comprises the steps of providing oxide, metal and carbide powders possessing an average particle size 0.5–2.0 microns and a maximum agglomerated particles size of 10 microns. Then, by mixing of oxide, carbide and metallic powders with a corresponding film-forming binder is prepared a slurry from which are cast films with thickness 20÷300 microns. As a film-forming binder it is preferable to use synthetic carboxylated butadiene-nitrile rubber. The synthetic rubber is added in slurry as a 5–16% solution in the benzine-acetone (1:1) mixture, in quantity 15 mas. % (in account on dry weight of the system: rubber+component of the composite).

For manufacture of ductile organo-ceramic films some other film forming binders can be used (R. Mistler, Ceramic Bull., v.69, No.6).

The cast films are cut to fixed length pieces, which then are collected into 2–5 mm thickness packets, consisting of alternatively ordered metal, carbide and oxide based films. The quantity of the same type films in every layer depend upon the films thickness and upon the desirable composition of the composite. The layers must have a minimum thickness to obtain the best quantity of interfaces.

The film packets are subjected subsequently to densification in a roll mill, resulting in the reduction of their thickness to about 0.5–1 mm. This is done to reduce porosity, which take place in the ex-casted films. The films, which constitute these multilayer packets, may have a thickness, after rolling, in the range of 5–50 microns.

Further operations are connected with manufacture of the so-called complex-mass. The film packets, that were densified by the roll mill treatment, are packed, for instance, in spiral shape, into a steel cylindrical press die to form a multilayer cylindrical billet by uniaxial compaction.

Figure 8B:
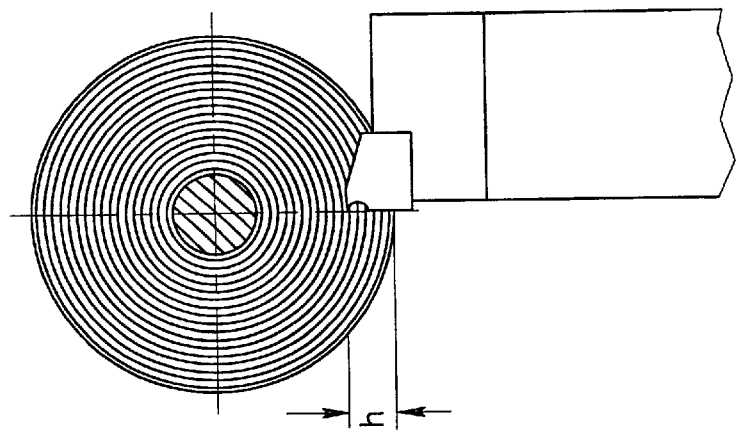
FIGS. 8A and 8B: show the manner of manufacturing laminated metal-ceramic chips in accordance with the invention; (seen in a multilayer cylinder billet (1), a mandrel (2) and a cutting tool (3))
Figure 8A:
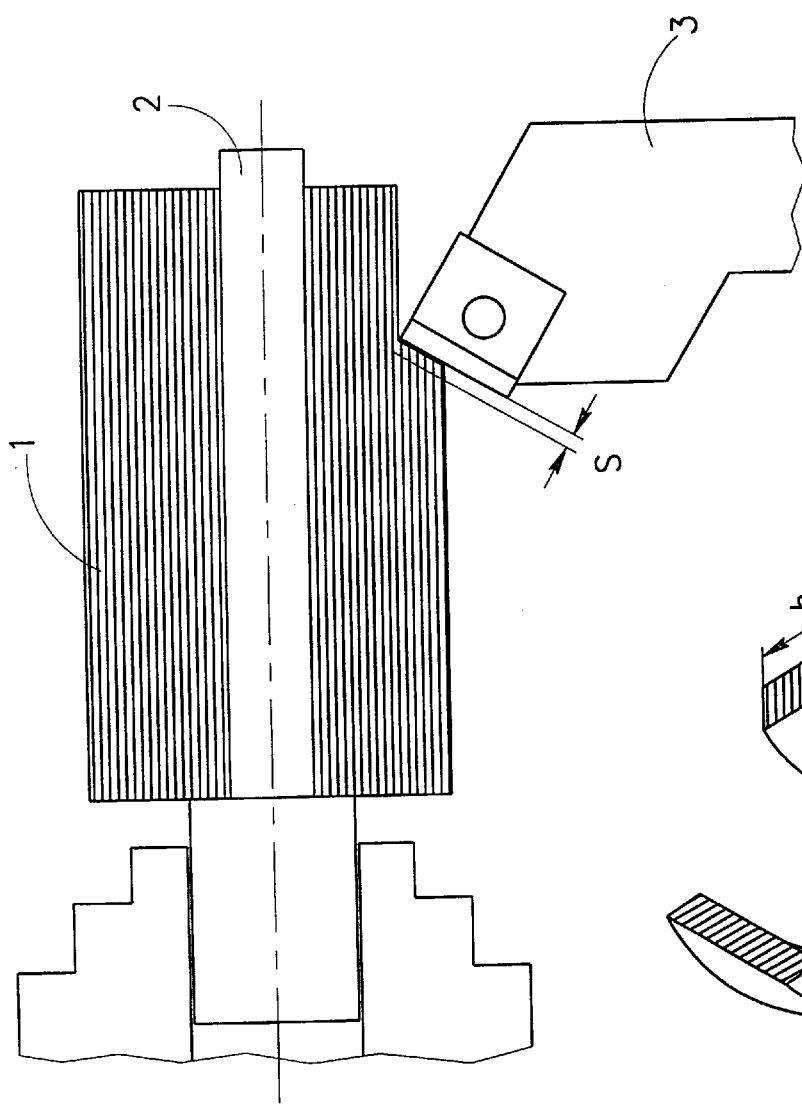

These laminated billets are subjected to turning on a lathe to produce multilayer chips with a width h=2÷7 mm, a thickness of S=0.1÷0.5 mm and a length l=3÷30 mm, preferably l=5÷10 mm (FIG. 8).

Then an article of desired shape and dimensions (taking into consideration shrinkage during sintering) is formed from the multilayer chips in a press die at a pressure in the range of 50÷1000 MPa.

The compacted article is then heated in a vacuum or in an inert gas for removal of binder, in the temperature range from RT to 500° C. with a temperature growth rate of 1÷10° C./hour.

The "brown" article is subjected to a preliminary sintering at a temperature in the range of 1150÷1450° C. until an article is reached of approximately 50÷75% of theoretical density.

The pre-sintered porous article is then densified to approximately 80–90% of its theoretical density by sintering the body in a vacuum furnace at a temperature in the range of 1300–2000° C.

A composite body of a comparatively simple shape, practically devoid of pores, can be produced by a Hot Pressing operation after the above described pressureless sintering. The ceramic article is subjected to Hot Pressing in a graphite mold at a pressure in the range of 5÷100 MPa and at a temperature in the range of 1400÷2000° C., in vacuum or in an inert gas, in a resistively heating furnace or in an inductively heating furnace, for a period of time that is sufficient to reach practically the theoretical density.

Articles with more complicated and, especially, with thin-walled shape can be densified up to a practically pore-less condition by the use of Hot Isostatic Pressing (HIP) in inert gas under a pressure in the range of 100÷300 MPa and at a temperature in the range of 1400÷2000° C., also for a period of time that is sufficient for reaching practically the theoretical density.

Properties of the Novel Composites

Properties of the novel composites strongly depend on their composition. In Tables 2–5 are represented physical-mechanical properties of some typical composites: Table 2 for Group 2 Composites $nY_2O_3/Mo$, Table 3 for some composites of Group 1 and Group 2, Table 4 and Table 5 for some composites of the Group 3.

TABLE 2

The properties of vacuum pressureless sintered $nY_2O_3/Mo$ composites (maximum work temperature 2050° C.):

| | Fraction, vol. % | | Bending strength, MPa | | | Number of quenches, | Oxidizing resistance |
|---|---|---|---|---|---|---|---|
| Type | $Y_2O_3$ | Mo | at 20° C. | 600° C. | after one quench* | N | R at 1400° C. |
| Y | 100.0 | — | 80 | 12 | 12 | 1 ÷ 2 | — |
| 9Y/M | 90.0 | 10.0 | 55 | 50 | 22 | 2 ÷ 3 | >20 |
| 7Y/M | 87.5 | 12.5 | 62 | 60 | 37 | 2 ÷ 4 | >20 |
| 5Y/M | 83.3 | 16.7 | 74 | 100 | 85 | 14 ÷ 20 | 8 ÷ 10 |
| 3Y/M | 75.0 | 25.0 | 110 | 170 | 140 | 16 ÷ 24 | 5 ÷ 8 |
| Y/M | 50.0 | 50.0 | 175 | 270 | 200 | 20 ÷ 30 | 2 ÷ 5 |
| Y/2M | 33.3 | 66.7 | 266 | 415 | 320 | 20 ÷ 30 | 0.2 ÷ 0.5 |
| Y/3M | 25.0 | 75.0 | 360 | 570 | 410 | 20 ÷ 30 | 0.1 ÷ 0.2 |

N-Number of cold quenches 1000° C.→20° C. (water), until destruction. (moderate velocity heat to 1000° C. and quench in water a 20 ÷ 25° C.)
R-Time, in hours, before start of specimen destruction;
*)-after one quench 1000° C.→ 20° C.(water).

TABLE 3

The Properties of composites usable at work temperature up to 2000° C.:

| | Fraction, vol. % Component: | | Apparent density, | Hardness, | Bending strength at 20° C., | Number of quenches, | Max. work temperature, |
|---|---|---|---|---|---|---|---|
| Type | Ceramic | Metal | g/cm³ | GPa | MPa | N | °C. |
| | COMPOSITE Mullite/Chromium | | | | | | |
| Ml/Cr | 50 | 50 | 5.15 | — | 320 | 60 ÷ 100 | 1350 |
| | COMPOSITE $(0.98 Al_2O_3 + 0.02 TiO_2)$/Cr | | | | | | |
| AT/Cr | 50 | 50 | 5.50 | 14.0 | 340 | 25 ÷ 30 | 1400 |
| | COMPOSITE $(0.8(ZrO_2 \times 0.04 Y_2O_3) + 0.2 Al_2O_3)$/Mo | | | | | | |
| PSZA/M | 50 | 50 | 7.81 | 8.5 | 480 | 25 ÷ 30 | 1750 |
| | COMPOSITE (0.9 TiN + 0.1 Cr)/Nb | | | | | | |

TABLE 3-continued

The Properties of composites usable at work temperature up to 2000° C.:

| Type | Fraction, vol. % Component: Ceramic | Metal | Apparent density, g/cm³ | Hardness, GPa | Bending strength at 20° C., MPa | Number of quenches, N | Max. work temperature, °C. |
|---|---|---|---|---|---|---|---|
| TN/Nb | 50 | 50 | 6.92 | 14.1 | 680 | 35 ÷ 40 | 1800 |
| COMPOSITE (0.45 TiC + 0.5 TiN + 0.05 Cr)/Mo | | | | | | | |
| TCN/M | 50 | 50 | 7.25 | 15.3 | 650 | 40 ÷ 50 | 1800 |
| COMPOSITE nY₂O₃/Nb | | | | | | | |
| 3Y/Nb | 75 | 25 | 5.08 | — | 160 | 16 ÷ 20 | 1800 |
| 2Y/Nb | 66.6 | 33.4 | 5.17 | — | 144 | — | 1800 |
| Y/Nb | 50 | 50 | 5.87 | — | 190 | 16 ÷ 20 | 1800 |
| COMPOSITE (0.9 TiB₂ + 0.1 Ni)/Nb | | | | | | | |
| TB/Nb | 50 | 50 | 7.05 | 17.5 | 420 | 40 ÷ 50 | 1800 |
| COMPOSITE n(0.98 Al₂O₃ + 0.02 BaTiO₃)/Mo | | | | | | | |
| 3AB/M | 75 | 25 | 4.91 | 13.5 | 226 | 15 ÷ 20 | 1850 |
| AB/M | 50 | 50 | 6.64 | 9.0 | 360 | 25 ÷ 30 | 1850 |
| COMPOSITE n(ZrO₂ × 0.04 Y₂O₃)/Nb | | | | | | | |
| PSZ/Nb | 50 | 50 | 7.02 | 7.2 | 450 | 35 ÷ 40 | 2000 |

N-Number of cold quenches 1000° C.→20° C. (water), until destruction. (moderate velocity heat to 1000° C. and quench in water at 20 ÷ 25° C.)

TABLE 4

The properties of two-component super high-temperature composites:

| Type | Fraction, vol. % Components: Oxide | Metal | Apparent density, g/cm³ | λ, at 600° C. W/m-K | Bending strength at 20° C., MPa | $K_{1c}$, MPa-m$^{1/2}$ | Number of quenches, N | Max. work. temp., ° C. |
|---|---|---|---|---|---|---|---|---|
| COMPOSITE nY₂O₃/Mo (see also Table 2) | | | | | | | | |
| 3Y/M | 75 | 25 | 5.57 | 22.1 | 110 | 5.5 ÷ 7 | 16 ÷ 24 | 2050 |
| Y/M | 50 | 50 | 6.78 | 44.0 | 175 | 6 ÷ 8 | 20 ÷ 30 | 2050 |
| COMPOSITE n(ZrO₂ × 0.01 Y₂O₃)/Mo | | | | | | | | |
| 5Z/M | 83 | 16 | 5.65 | 15.4 | 270 | — | 10 ÷ 12 | 2200 |
| 3Z/M | 75 | 25 | 6.01 | 24.0 | 290 | 7.5 ÷ 11 | 22 ÷ 26 | 2200 |
| Z/M | 50 | 50 | 7.07 | 49.8 | 365 | — | 24 ÷ 30 | 2200 |
| COMPOSITE nY₂O₃/W | | | | | | | | |
| 3Y/W | 75 | 25 | 7.56 | 24.9 | 345 | — | 14 | 2200 |
| 2Y/W | 67 | 33 | 8.59 | 31.5 | 295 | — | — | 2200 |
| Y/W | 50 | 50 | 10.77 | 48.9 | 360 | 6 ÷ 9 | 20 | 2200 |
| COMPOSITE n(ZrO₂ × 0.1 Y₂O₃)/W | | | | | | | | |
| 5Z/W | 83 | 17 | 6.99 | 15.0 | 216 | 7 ÷ 10.5 | 12 ÷ 15 | 2500 |
| 3Z/W | 75 | 25 | 8.01 | 23.0 | 200 | 6 ÷ 9 | 10 ÷ 15 | 2500 |
| 2Z/W | 67 | 33 | 8.99 | 26.0 | 265 | 6.5 ÷ 9 | 10 ÷ 15 | 2500 |
| Z/W | 50 | 50 | 11.07 | 45.9 | 235 | — | 15 ÷ 20 | 2500 |
| COMPOSITE n(HfO₂ × 0.1 Y₂O₃)/W | | | | | | | | |
| 3H/W | 75 | 25 | 11.05 | 21.0 | 305 | 7 ÷ 11 | 10 ÷ 18 | 2600 |
| H/W | 50 | 50 | 13.10 | 43.4 | 440 | 7.5 ÷ 11.5 | 10 ÷ 14 | 2600 |
| H/2W | 33 | 67 | 14.49 | 55.4 | 460 | 7.5 ÷ 12 | 22 ÷ 26 | 2800 |

N-Number of cold quenches 1000° C.→20° C. (water), until destruction. (moderate velocity heat to 1000° C. and quench in water at 20 ÷ 25° C.)

TABLE 5

The properties of some three-component ultra high-temperature composites:

| Type | Fraction, vol. % | Apparent density, g/cm$^3$ | λ, W/m.K, at 600° C. | Bending strength, MPa, at 20° C. | Number of quenches, N | Max. work, temperature ° C. |
|---|---|---|---|---|---|---|
| | COMPOSITE 0.5(ZrO$_2$ × 0.1 Y$_2$O$_3$)/0.3 ZrC/0.2 W | | | | | |
| Z/ZrC/W | 50/30/20 | 8.22 | 3.7 | 460 | 12 ÷ 15 | 2600 |
| | COMPOSITE 0.5(HfO$_2$ × 0.1 Y$_2$O$_3$)/0.3 HfC/0.2W | | | | | |
| H/HfC/W | 50/30/20 | 12.20 | — | 420 | 8 ÷ 14 | 2750 |
| | COMPOSITE 0.5 ThO$_2$/0.3(Hf$_{0.67}$Ta$_{0.23}$W$_{0.1}$C)/0.2W | | | | | |
| ThO$_2$ HfTaWC/ W | 50/30/20 | 11.8 | — | 610 | 14 ÷ 18 | 2800 |

N-Number of cold quenches 1000° C.→20° C. (water), until destruction. (moderate velocity heat to 1000° C. and quench in water at 20 ÷ 25° C.)

The influence of composition on the novel composite properties are considered on the basis of the example of nY$_2$O$_3$/Mo composites. In Table 2 are represented results of measurements of bending strength, heat conductivity, resistance to multiple quenching and oxidizing resistance for some variants of nY$_2$O$_3$/Mo composites.

From the data of Table 2 one can see that only those composites of the type have practical significance, which have a volume ratio of oxide component to metallic component in the range from 1 to 5.

The composites with V$_{ox}$:V$_{met}$<1 do not possess a good high-temperature oxidizing resistance because of a considerable content of the metallic component. In such composites, as, for instance, composite Y/2M and composite Y/3M, already at heating in air up to 1400÷1700° C. occurs a degradation of surface within 1÷2 hours, but they have a considerably increased abrasive resistance as compared with pure molybdenum. On the other hand, the composites of the type with a low metal content, for instance the composite 7 Y/M and composite 9 Y/M have a low thermal endurance and thermal-shock resistance, that does not differ from the corresponding properties of pure Y$_2$O$_3$.

The influence of composition on the novel composite properties are considered on the basis of the example of nY$_2$O$_3$/Mo composites. In Table 2 are represented results of measurements of bending strength, heat conductivity, resistance to multiple quenching and oxidizing resistance for some variants of nY$_2$O$_3$/Mo composites.

From the data of Table 2 one can see that only those composites of the type have practical significance, which have a volume ratio of oxide component to metallic component in the range from 1 to 5.

The composites with V$_{ox}$:V$_{met}$<1 do not possess a good high-temperature oxidizing resistance because of a consideration content of the metallic component.

In such composites, as, for instance, composite Y/2M and composite Y/3M, already at heating in air up to 1400÷1700° C. occurs a degradation of surface within 1÷2 hours, but they have a considerably increased abrasive resistance as compared with pure molybdenum. On the other hand, the composites of the type with a low metal content, for instance the composite 7 Y/M and composite 9 Y/M have a low thermal endurance and thermal-shock resistance, that does not differ from the corresponding properties of pure Y$_2$O$_3$.

Figure 6:
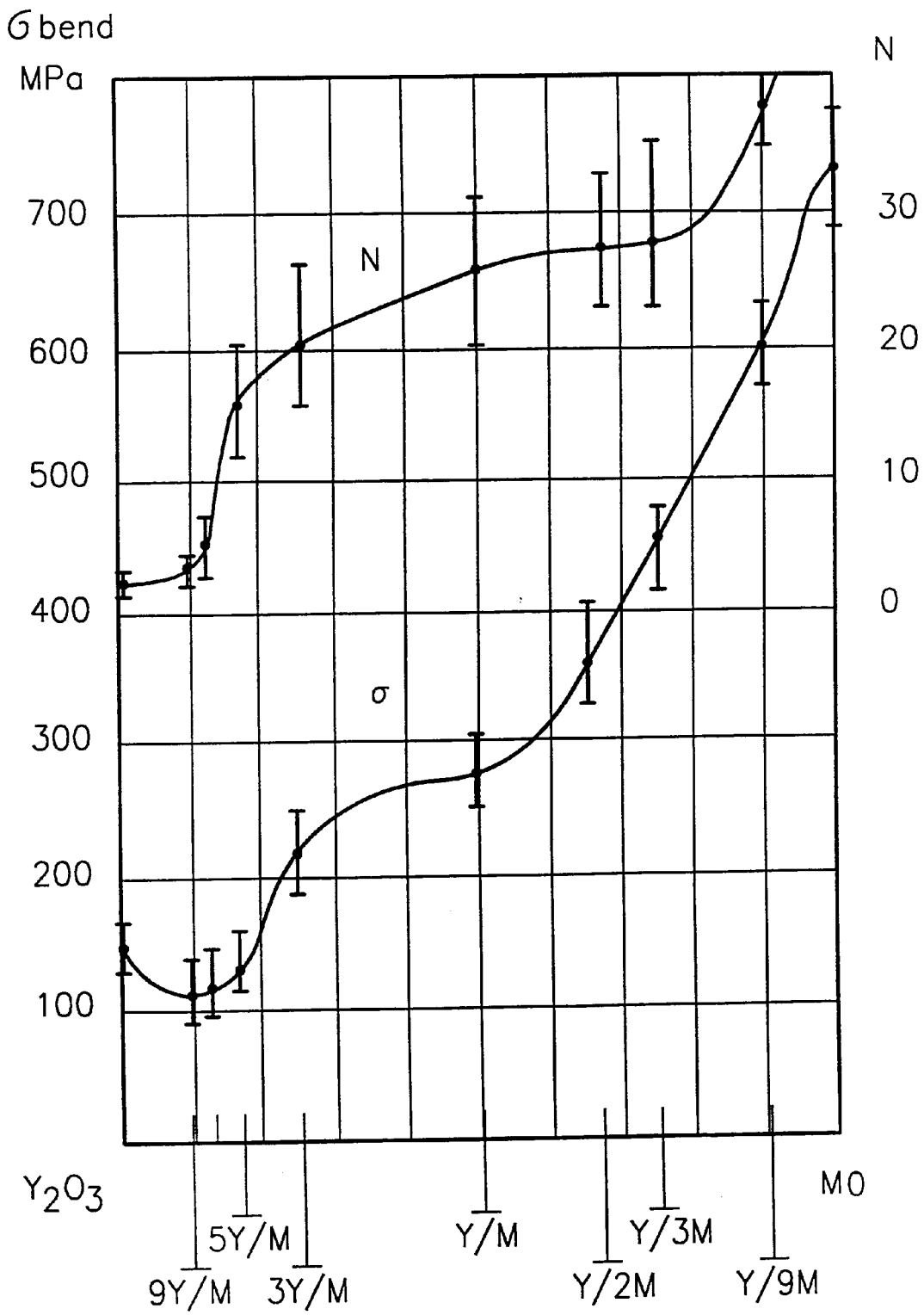
FIG. 6: shows concentration dependencies of the bending strength and thermal shock resistance at multiple quenching in water N of $nY_2O_3/Mo$ composites.

In FIG. 6 are shown the concentration dependencies of bending strength and thermal shock resistance at multiple water quenches of the composite nY$_2$O$_3$/Mo.

Figure 7:
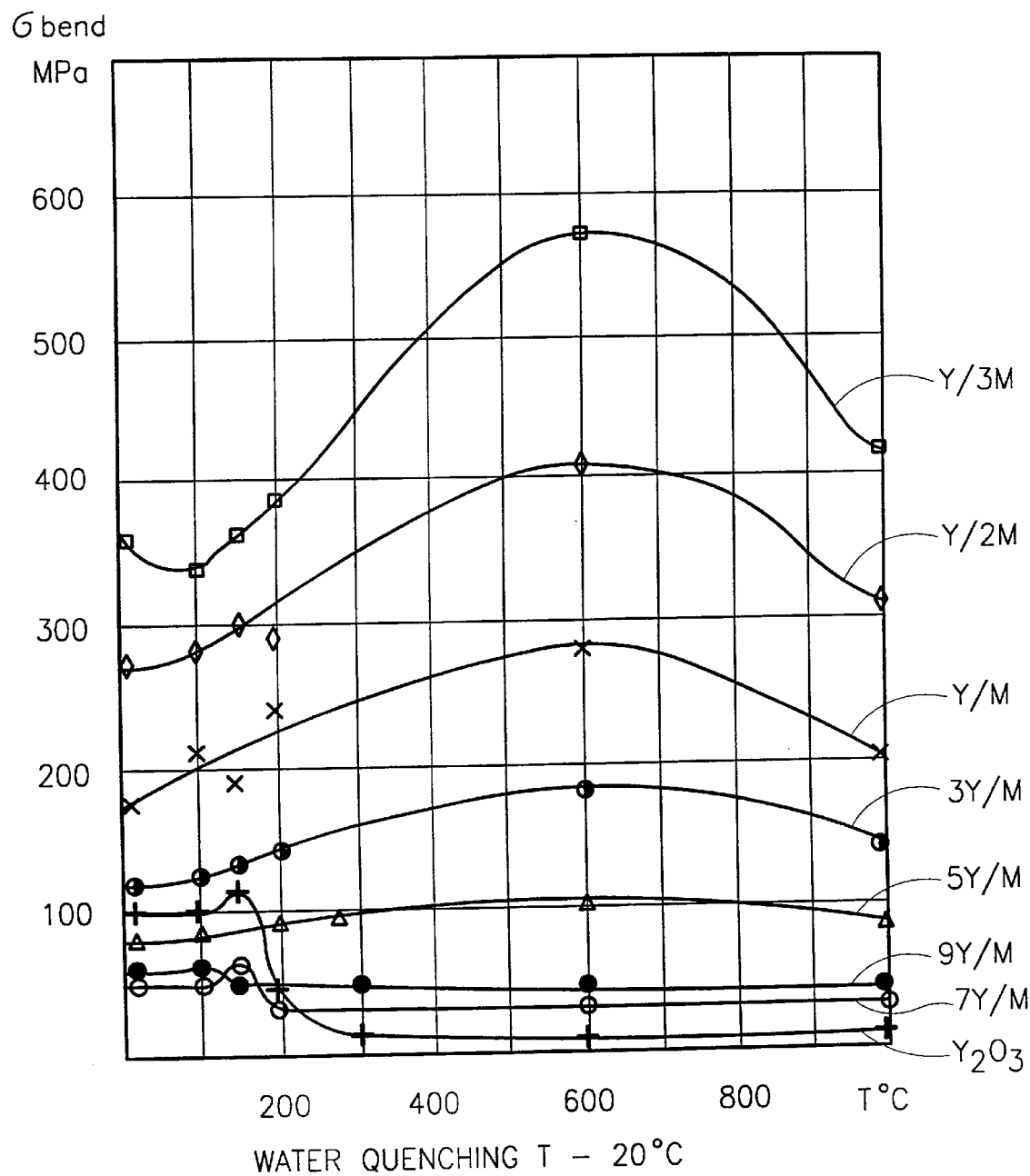
FIG. 7: shows $nY_2O_3/Mo$ composites strength degradation after a single quench in water from different heating up temperatures.

In FIG. 7 are shown experimental results of strength degradation of the composite nY$_2$O$_3$/Mo specimens after a single quench in water from different temperatures of heating up.

As it is evident from FIG. 7 the strength of composites, containing more than 17 vol. % of Mo (the composites Y/M, 3 Y/M and 5 Y/M), is practically not reduced after quenches in water from the heating up temperatures right up to 1000° C., and at a certain temperature interval (400–700° C.) even increases. At the same time, the strength of nY$_2$O$_3$/Mo composites with a metal component content below the critical value of 15 vol. % (for example, composites 7 Y/M and 9 Y/M), at their quench from the temperature, that exceeds 140÷160° C., substantially go down, which is typical for the behavior of the pure oxide.

All this data show that nY$_2$O$_3$/Mo composites must be used only with n=1÷5.

DESCRIPTION OF THE PREFERABLE TECHNOLOGY

The technology of the novel composite articles starts with the preparation of oxide, metal and carbide powders with an average particle size of 1 to 2 microns and a maximum agglomerated particle size of 10 microns.

For grinding and de-agglomerating the powders are used a grinding media which don't create a danger of powder contamination. For example, there can be used a polyurethane or a rubber lined milling jar and grinding bodies from zirconia or yttria.

Use of highly effective WC-Co balls in vibration mill leads to contamination of powder with up to 0.2–0.5% of tungsten—depending on grinding time and the powder hardness. But for the novel composites this is not dangerous, and in some situations the impurity of tungsten is a useful metal additive.

A contamination of the powder, in the process of its grinding, with traces of Fe, Ni and other elements, which are ground out from a jar wall material, are also permissible, because these elements, in most cases, are not high-melting and are easily evaporated during sintering.

In general an average particle size has not to be less than 0.5–1 micron, as powder with elevated specific surface area requires a rise of quantity of binder for ensuring a necessary viscosity and cast properties of the slurry, that lead, ultimately, to an undesirably high shrinkage at sintering.

On the other hand, with the use of particles with an average size, considerably above 2–3 microns, the sintering conditions get worse, dwell temperature and/or dwell time, necessary for porosity reduction, are increased.

After grinding and de-agglomerating the powders are dried: oxide powders are dried at 400÷800° C. during 2–5 hours, metallic and carbide powders are dried at 250÷350° C. during 2–5 hours.

After milling and drying, the powder is passed through a 400 mesh sieve to remove large agglomerates.

Then an organic binder is added to the dry and de-agglomerated powders. As a film forming binder can be used as many different substances. For the novel composite production is especially suitable synthetic butadiene-nitrile rubber. The rubber is added in slip as the 5–16% solution (mas. %) of it in benzine-acetone (which are mixed in proportion from 1:1 to 4:3 volume parts) mixture in quantity 15 mas. % (in account on dry weight of the system: rubber+powder).

Such rubber binder has a number of advantages compared with well known binders (acrylic polymer, hydroxyethyl cellulose, polyurethane, polyvinyl butyral, etc.), and, in particular, has a good ductility that is necessary for making the, so called, complex-mass.

For instance, a binder such as polyvinyl-butyral permits to cast films of 20÷40 microns thickness even more easily than the butadiene-nitrile rubber binder, but the polyvinyl butyral binder is uncomfortable for the laminated chips making by lathe machining: multilayer billets consisting of films, which were cast using polyvinyl butyral, show east of cracking at lathe machining at room temperature and for prevention of the cracking it needs heating during the machining.

Mixing of the binder with corresponding powder is better to be executed in the same type ball vibration mill during 1.5 2 hours.

Casting of the organo-ceramic films can be carried out on any of conventional industrial machines, which are used for ceramic film casting by the "doctor blade" "double doctor blade" method.

It was established experimentally that satisfactory properties of the composite material can be reached by use of films with a thickness from 20 to 300 microns.

Films with a thickness of less than 20 microns are difficult to make by usual methods of ceramic tape casting.

Films with a thickness that is greater than 300 microns are unreasonable to be cast, because it is impossible to get multilayer chips with the necessary frequency of interfaces.

It is most preferable to use films, which were cast with a thickness of 50÷100 microns.

On the operations of the film packets uniaxial compaction and following roll milling a thickness of the films are reducing usually in a 3 8 times—up to 15–20 microns.

Films, which were cast with the use of the above listed different powders, are then cut to pieces of 120–180 mm long.

From the film pieces are assembled packets in accordance with the desirable composition of the composite. These packets are then rolled out to 1 mm thickness.

For example, at manufacture of specimens from 5 Y/M, 3 Y/M and Y/M composites, containing accordingly 17, 25 and 50 vol. % of molybdenum, the film pieces were collected in 3÷5 mm thickness packets, consisting of alternatively ordered oxide and metal films, with thickness ratio of oxide to metal films 5:1 (0.6 and 0.12 mm) in 5 Y/M, 3:1 (0.36 and 0.12 mm) in 3 Y/M and 1:1 (0.12 and 0.12 mm) in Y/M. These packets were rolled out to 0.7÷1 mm thickness; thanks to rolling process a thickness of the constituent films were reduced in 2.5÷4 times.

The densified film packets are then laid as spiral into a cylindrical press die and subjected to uniaxial pressing with the purpose of cylindrical multilayer billet manufacture.

Figure 8C:
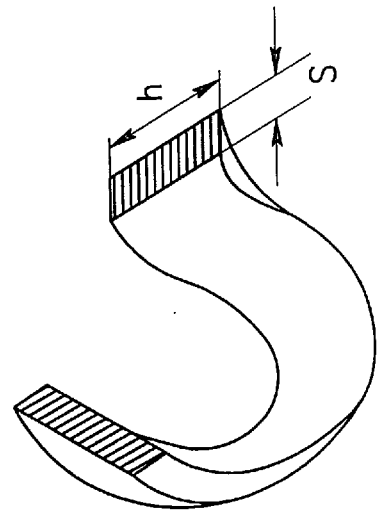
FIG. 8C: shows a metal ceramic-chip manufactured in this manner

These multilayer billets are used for manufacture of the multilayer chips. With this purpose the billets are subjected to turning on a lathe to manufacture multilayer chips with 0.2–0.5 mm thicknesses, 2–6 mm width, and 5–25 mm length (FIG. 8C).

It was found experimentally that the width of the chip must be no more than 5–7 mm, that is no more than 15–25 thicknesses of the chip, and no less than 5–10 thicknesses of the chip.

It was shown experimentally that the length of the multilayer chip must be no less than 25–50 thicknesses of the chip.

Of course, the chips with such dimensions can be manufactured by other methods, for example by mechanical treatment of a multilayer plate on a planer, but in the variant of technological process it is need to use sufficiently large multilayer plates, which are usually difficult for manufacture.

In the following technological operation the multilayer chips are put into the press die for cold pressing.

Depending on the shape of the article shaping can be carried out by the use of uniaxial pressing in a "usual" metallic press die or by the use of cold isostatic or quasi-isostatic pressing, usually under a pressure in the range of 100÷500 MPa, preferably 150÷250 MPa.

Figure 9:
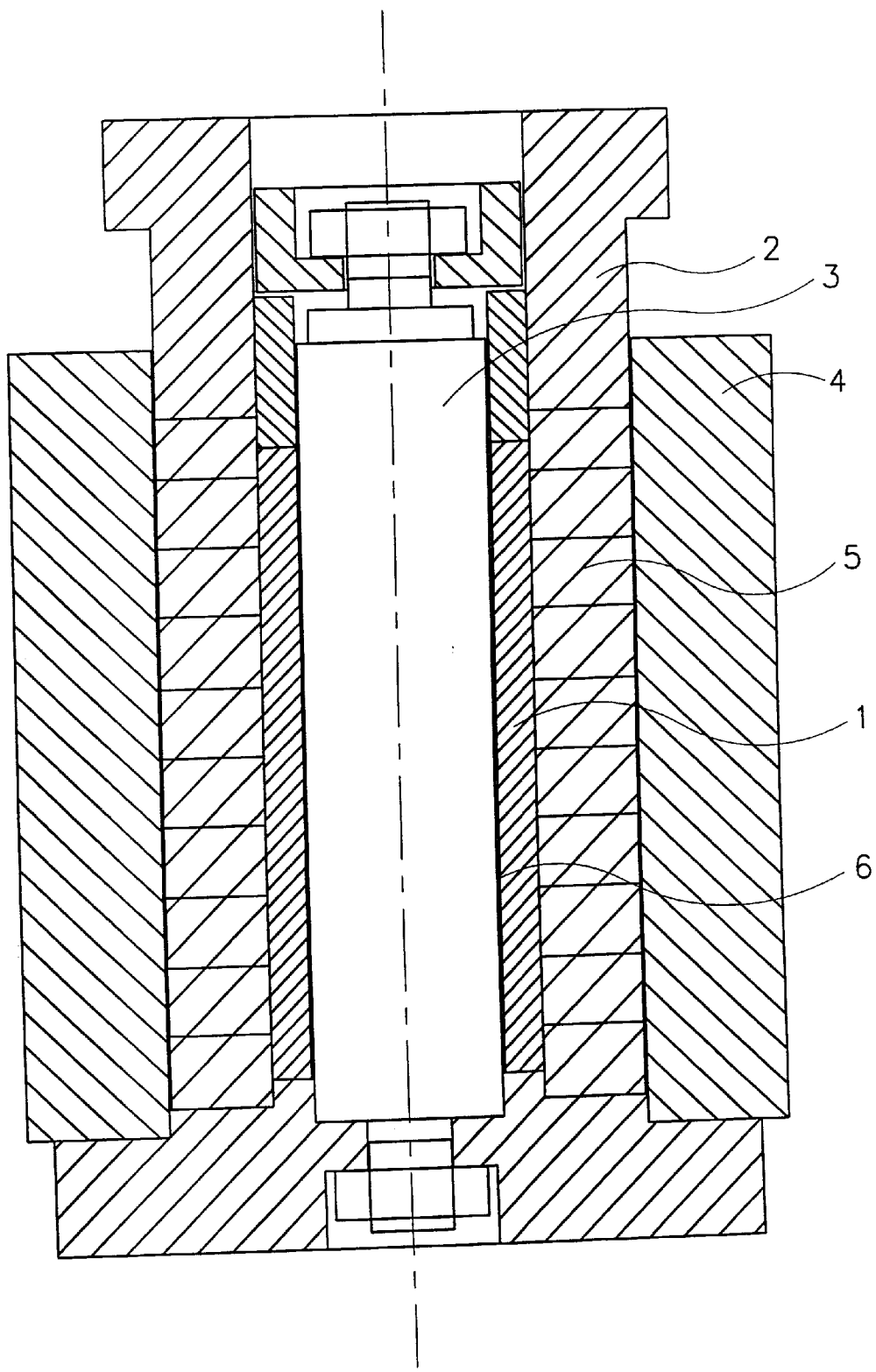
FIG. 9: shows a mold for quasi-isostatic forming of thin wall articles from the novel composites (seen in "brown" article (1), punch (2), mandrel (3), steel matrix (4), rubber (5) and Teflon film (6)).

The press die that is intended for cold quasi-isostatic pressing can contains, for example, a TEFLON-coated steel mandrel, which forms the internal surface of the article to be formed, and a rubber sleeve, which forms the external surface of the article (FIG. 9).

Some products from the novel composites, in particular nozzles and combustion chambers (FIGS. 5A–5B), can have comparatively thin walls, which does not allow the use of a conventional press die.

It was shown experimentally that in this situation it is advantageous to apply the following double stage pressing technology:

In the first stage the billet is formed in a steel press die under a moderate pressure, and then the billet is subjected to quasi-isostatic pressing.

After the article has been removed from the mold it is subjected to a thermal treatment.

For simple shape articles, possess thick walls, the thermal treatment in a vacuum tungsten furnace is started from the stage of the binder (and it's solvents) removal and preliminary sintering at a temperature in the range of 1100÷1400° C. during span, which is necessary to reach the article density, which is approximately 50–75% of theoretical density. In the stage of thermal treatment the shrinkage usually is in the range from 3 to 12%.

A tungsten furnace is used, because in graphite furnace can take place a reduction of the novel composite oxide component and a carbidization of it's metallic component, as result of a chemical interaction with such a reducing agent as carbon, which presents in atmosphere of the graphite furnaces.

For provision of a gradual diffusion removal of decomposition products of the rubber binder the rate of a temperature rise must be in the range of 1–10° C./hour up to the temperature of a total binder burnout, which for most binders is about 500° C.

In the following stage the firm enough but quite porous yet article is sintered in a vacuum furnace at a temperature in the range of 1300÷2000° C. up to required density, which consists 85–95% of theoretical density.

If necessary, a following densification of the simple shape articles up to a density of 97–100% of theoretical density, can be carried out by Hot Pressing at a temperature in the range of 1300÷2000° C. and under a pressure of 20÷100 MPa.

Final densification of articles with more complicated shape, especially those having thin walls and which are uncomfortable for hot pressing, is carried out in a two-step process: the step of high-temperature vacuum sintering and the step of Hot Isostatic Pressing.

At the first step, the article of such type is pressureless sintered up to approximately 95–98% of theoretical density, that is up to a state with a very large fraction of closed porosity. The high-temperature "dwell" span of the corresponding firing profile usually is 1 to 2 hours.

In the second step, the pressureless sintered article is densified up to practically 100% of theoretical density by Hot Isostatic Pressing at a temperature in the range of 1300÷2000° C. and in an inert gas pressure of 150÷200 MPa. If the HIP plant is equipped with a graphite furnace the article can be shielded from interaction with carbon by $Y_2O_3$ powder or by another oxide.

While we have described our invention in detail it will of course be understood that we have done so for the purpose of illustration only and not for the purpose of limitation.

What is claimed is:

1. A composite solid material, resistant to elevated temperatures and to mechanical forces, containing up to 85 vol. % of an oxide component resistant to high temperatures, up to 85 vol. % of a compound devoid of oxygen component resistant to high temperatures, and 15 to 17 vol. % of a refractory metal component, where each of the components of the composite material exists in the form of a plurality of curved non-continuous tapes, and where the tapes of every component are joined with the tapes of the other components forming multilayer curved band-like chips, which are randomly interlaced in a compact 3-dimensional pattern of the chips, each of which has at least two layers of different components.

2. A composite according to claim 1, where the component curved tapes have a thickness in the range of 5 to 150 microns.

3. A composite according to claim 1, where the multilayer curved band-like chips have a thickness of the order of from tens to hundreds of microns, a length from about 25 to 150 times of their thickness and a width of the order of about 5 to 50 times their thickness.

4. A composite according to claim 1, wherein said multilayer band-like chips have a curved shape that results in their intensive three-dimensional interlacing.

5. A composite according to claim 4, where contains as oxide $Y_2O_3$ and as metallic component W, Mo or Nb.

6. A composite according to claim 1, wherein the oxide component is selected from the group consisting of $Al_2O_3$, $Y_2O_3$, $HfO_2$, $ThO_2$, stabilized $ZrO_2$, stabilized $HfO_2$ or a complicated oxide on the basis of any of these.

7. A composite according to claim 1, wherein the compound devoid of oxygen is selected from the group consisting of carbide of Zr, Nb, Ti or Hf, a complicated carbide HfC—TaC, a boride of Ti or Zr, a nitride of Ti, a complicated carbide-boride TiC—$TiB_2$, or a complicated compound of any of these.

8. A composite according to claim 7, wherein the metallic component is a metal of high melting point selected from the group consisting of Cr, Zr, Nb, Ta, W with addition of up to 2 wt. % of $ThO_2$, Mo or alloys of any of these.

9. A composite according to claim 1, comprising as oxide component $Al_2O_3$ with addition of up to 2 wt. % of $TiO_2$ and as metallic component Cr, Mo or W.

10. A composite according to claim 1, wherein the volume ratio of the oxide component to the metallic component is in the range of about 1 to about 5.

11. A composite according to claim 1, wherein the oxide component is mullite $3Al_2O_3 \cdot 2SiO_2$, or mullite with addition of up to 5 wt. % of $Al_2O_3$, and the metallic component is pure Cr or Cr with addition of up to 10 wt. % of MgO.

12. A composite according to claim 1, wherein the volume ratio of the oxide component to the metallic component is within the range of about 0.5 to about 2.

13. A composite according to claim 1, wherein the oxide component is fully stabilized zirconia $ZrO_2 \cdot 0.1Y_2O_3$ with addition of about 15 to about 25 wt. % of $Al_2O_3$ and the metallic component is Nb, Mo or W.

14. A composite according to claim 1, wherein the compound devoid of oxygen is TiC, TiN or $TiB_2$ with addition, as sintering aid, of Ni or Cr and wherein the metallic component is Cr, Nb or Mo.

15. A composite according to claim 1, wherein the oxide component is fully stabilized zirconia $ZrO_2 \cdot 0.1Y_2O_3$ and the metallic component is W or Mo.

16. A composite according to claim 15, comprising ZrC as a compound devoid of oxygen.

17. A composite according to claim 1, wherein the volume ratio of the oxide component to the metallic component is within the range of about 2 to 7.

18. A composite according to claim 1, wherein the oxide component is fully stabilized $HfO_2$ and the metallic component is W or Mo.

19. A composite according to claim 18, comprising HfC as compound devoid of oxygen.

20. A composite according to claim 1, 15 or 18, wherein the volume ratio of the oxide component to the metallic component is from within the range of about 0.3 to about 2.

21. A composite according to claim 1, wherein the oxide component is $ThO_2$ and the metallic component is W or Mo.

22. A composite according to claim 21, comprising as compound devoid of oxygen the complicated carbide HfC—TaC with addition of up to 6 wt. % of W.

23. A composite according to claim 1, comprising as compound devoid of oxygen component the post eutectic carbide-graphites in the systems HfC—C, TaC—C, ZrC—C or NbC—C, and as metallic component W with addition of up to 2 wt. % of $ThO_2$.

24. A method of manufacture of composites of claim 1, comprising the following steps:

(a) conditioning initial powders of oxide, metal and a compound devoid of oxygen, by grinding and de agglomeration of them, for example, with use of a ball vibration mill, up to an average grain size of about 0.5 to 2 microns;

(b) drying the powders;

(c) removal of large agglomerates from the said powders by passing them through a rough mesh;

(d) preparation of casting suspensions by mixing said powders with a binder solution;

(e) casting from the said suspensions films, by the "doctor blade" or "double doctor blade" methods, of a thickness in the range of 20 to 300 microns;

(f) assembling of packets from the said films of the different components in corresponding order of their interchange, which provide desirable volume fractions of the composite components;

(g) densifying the said multilayer packets by uniaxial pressing and rolling;

(h) forming of multilayer cylinder billets from the said compacted multilayer packets;

(i) producing multilayer chips by turning the said multilayer cylinder billets on a lathe;

(j) compacting of an article from the said laminated chips;

(k) pressureless sintering the compacted article up to density of at least 75 to 90% of the composite material theoretical density;

(l) further consolidation of the said pressureless sintered article, if required, by hot pressing or hot isostatical pressing at a temperature, pressure and during a time, which is enough for reaching a density of 95 to 100% of the theoretical density.

25. A method according to claim 24, wherein the said powders have an average particle size of about 0.5 to 2.0 microns and a maximum agglomerated particles size of 10 microns.

26. A method according to claim 24, wherein the binder is a solution of rubber in a benzene-acetone mixture.

27. A method according to claim 24, wherein the multilayer packets have a thickness of 1 to 5 mm and consist, for a two components composite of at least 4 layers, and consist of at least 6 layers in three components composite.

28. A method according to claim 24, wherein the multilayer packets, before stacking in billet, are densified by rolling up or by uniaxial pressing to a thickness of 10 to 50% of the packets' initial thickness.

29. A method according to claim 24, wherein the said multilayer chips have a width of 2 to 6 mm, a thickness of 0.2 to 0.5 mm, and a length of no less than 5 to 10 mm, and the multilayer chips consist of at least of 4 layers for a two components composite material, and at least 6 layers for three components composite material.

30. A method according to claim 24, wherein the said pressureless sintering step is carrying out in a vacuum furnace, which is equipped with tungsten rod or tungsten mesh heating elements.

31. A method according to claim 24, wherein the temperature of pressureless sintering is in the range of 1600° C. to 2000° C.

32. A method according to claim 24, wherein a further consolidation is carrying out at a temperature in the range of 1300° C. to 2000° C. and at a pressure in the range of 20 to 150 Mpa.

33. A method according to claim 24, wherein for the manufacture of an article of two or more parts, which were press formed separately, the joining of the parts is carried out before the stages of debinding and sintering.

34. A method according to claim 24 or 33, wherein the joining of the separately press formed parts is carried out with a special rubber glue, which contains 0 to 95 vol. % of toluene, 0 to 50 vol. % of acetone and 5 and 15 vol. % of rubber.

35. A method according to claim 24 or 33, wherein the joining of the separately press formed parts is carried out either with use of a very small tolerance shaft-hole coupling or with use of a screw.

* * * * *